United States Patent [19]

Poe

[11] Patent Number: 4,545,905

[45] Date of Patent: Oct. 8, 1985

[54] FILTER BACKWASH WATER SAVER AND WATER FILTER TO CLEAN SWIMMING POOL FILTER

[76] Inventor: James T. Poe, Rt. 1, Box 119, Haw River, N.C. 27258

[21] Appl. No.: 615,466

[22] Filed: May 30, 1984

[51] Int. Cl.⁴ .................... B01D 41/00; B01D 45/00
[52] U.S. Cl. .................... 210/136; 210/169; 210/278; 137/625.46
[58] Field of Search ............. 210/136, 169, 278, 249, 210/416.1, 416.2, 445, 448, 422, 426, 427, 425, 278, 677, 237, 238; 134/167 R; 137/625.46, 843, 844, 846, 853; 251/DIG. 2; 4/503, 506, 507, 508

[56] References Cited

U.S. PATENT DOCUMENTS

| | | | |
|---|---|---|---|
| 2,723,678 | 11/1955 | Wilson | 137/844 |
| 3,085,549 | 4/1963 | Kacsuta | 137/844 |
| 3,186,550 | 6/1965 | Beduhn | 210/249 |
| 3,365,604 | 1/1968 | Horan, Jr. | 210/169 |
| 3,370,408 | 2/1968 | Lehrer et al. | 55/429 |
| 3,827,568 | 8/1974 | Toth et al. | 210/448 |
| 4,108,775 | 8/1978 | Wilkes et al. | 210/169 |
| 4,194,975 | 4/1980 | Baker | 210/108 |
| 4,454,035 | 6/1984 | Stefan | 210/117 |

Primary Examiner—Richard V. Fisher
Assistant Examiner—Sharon T. Cohen
Attorney, Agent, or Firm—Richard L. Miller

[57] ABSTRACT

Filter backwash water saver and water filter to clean swimming pool filters which takes backwashed water from a filter which is usually discharged to the environment and instead filters the backwashed water and returns it to the system. This conserves water and protects the environment. The backwashed water is pumped into a filter contained in a canister which is suspended by a bracket which mounts to the pool cowling. The filtered backwash water is returned to the system by a specially designed chute which fits into the pool skimmer. A vinyl check valve is mounted into the chute to allow water to flow normally when the pool system is forward pumping by allowing the water to flow into the skimmer under the vinyl check valve. When backwashing is desired, the weight of the backwashed water flattens the vinyl check valve and only backwashed water recirculates. The filter material is easily accessible and easy to change.

8 Claims, 2 Drawing Figures

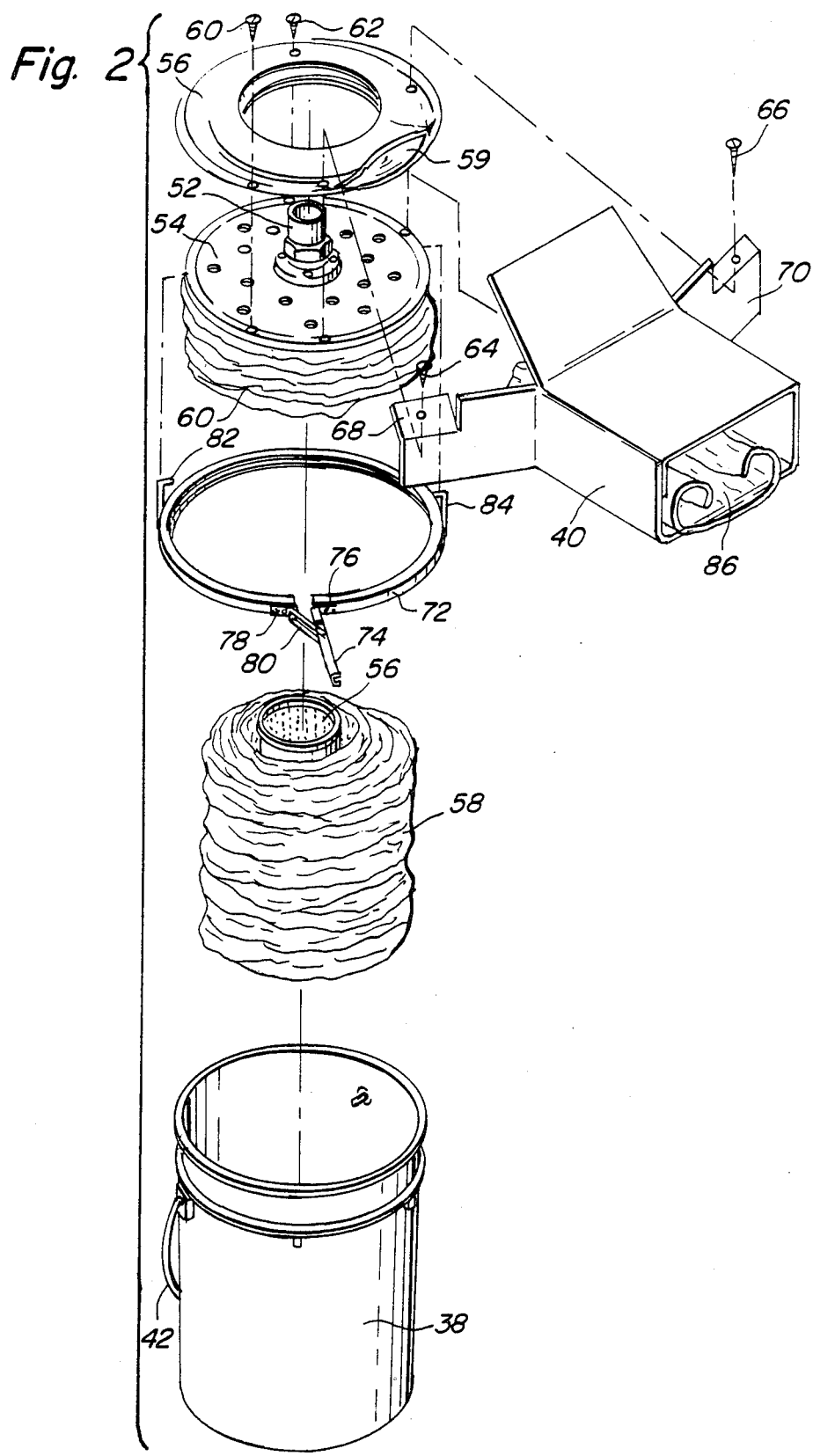

FILTER BACKWASH WATER SAVER AND WATER FILTER TO CLEAN SWIMMING POOL FILTER

BACKGROUND OF THE INVENTION

The present invention relates generally to liquid processing machinery and, more specifically, to filters designed to remove debris from backwashed liquid while returning the backwashed liquid to the normal forward liquid filtering process.

For the purpose of clarity, swimming pools will be used to exemplify the problems associated with this mode of filtering, although many industrial and residential liquid filtering applications present similar problems and may be solved by use of an embodiment of the instant invention.

Swimming pools water contains a great deal of debris suspended in solution including leaves, soil and insects. A number of filtering systems are available which filter this material which tends to gather at the top surface of the water due to water tension. Water flows into a skimmer, is pumped through a filter medium, either sand or diatomaceous earth and is then returned to the pool. Debris is trapped on the surface of the filter medium and unless removed clogs the filter, reducing the flow of water and possibly causing damage to the pump. Micro organisms may also flourish under these conditions.

The common remedy to this buildup of debris is to periodically reverse the water flow through the filter medium thereby dislodging the debris. This process is referred to as "backwashing" and is usually accomplished by using a backwash flow valve associated with the filter. Most filter manufacturers supply this valve as part of a filter package.

The debris-containing backwashed water is normally conducted through a long hose and is discharged into the earth or to a sump located as far as possible from the pool. The cost of water is rising almost everywhere due to increasing demand and decreasing pollution free supplies. This backwashed water, therefore, represents a significant waste of economic and natural resources. Also discharging polluted debris filled water into the earth is unsightly, unhealthy and illegal in some localities.

A number of inventions have addressed the issue of pool filtering in general. For example, C. Whitmer (U.S. Pat. No. 3,969,248), M. Baker (U.S. Pat. No. 4,194,975) and V. Kelly (U.S. Pat. No. 4,115,276) addressed general pool filtering systems, a backwash system for swimming pools and a multi-port backwash valve respectively, but, none of these inventions relates in any way whatsoever with the problem of discharged backwashed water.

SUMMARY OF THE INVENTION

It is, therefore, a primary object of the present invention to provide a filter backwash water saver and water filter to clean swimming pool filter which filters debris-filled backwash water and returns the filtered backwash water to the swimming pool thereby preventing any waste of precious water.

A further object is to provide a filter backwash water saver and water filter to clean swimming pool filter which takes backwashed water from the backwash waste water outlet of a backwash flow valve, filter the water and return the filtered water to the pool via the skimmer.

A further object is to provide a filter backwash water saver and water filter to clean swimming pool filter which may be left in place during normal operation of the swimming pool pump and which is activated only when the backwash flow valve is switched from a "normal" position to a "backwash" position.

A yet further object is to provide a filter backwash water saver and water filter to clean swimming pool filter in which the filter materials are inexpensive, easy to clean and easy to replace.

A still further object is to provide a filter backwash water saver and water filter to clean swimming pool filter which may be securely attached to the cowling of any swimming pool.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 2 is an exploded isometric pictorial of the invention per se.

DETAILED DESCRIPTION OF THE PREFERRED EMBODIMENTS

Figure 1:
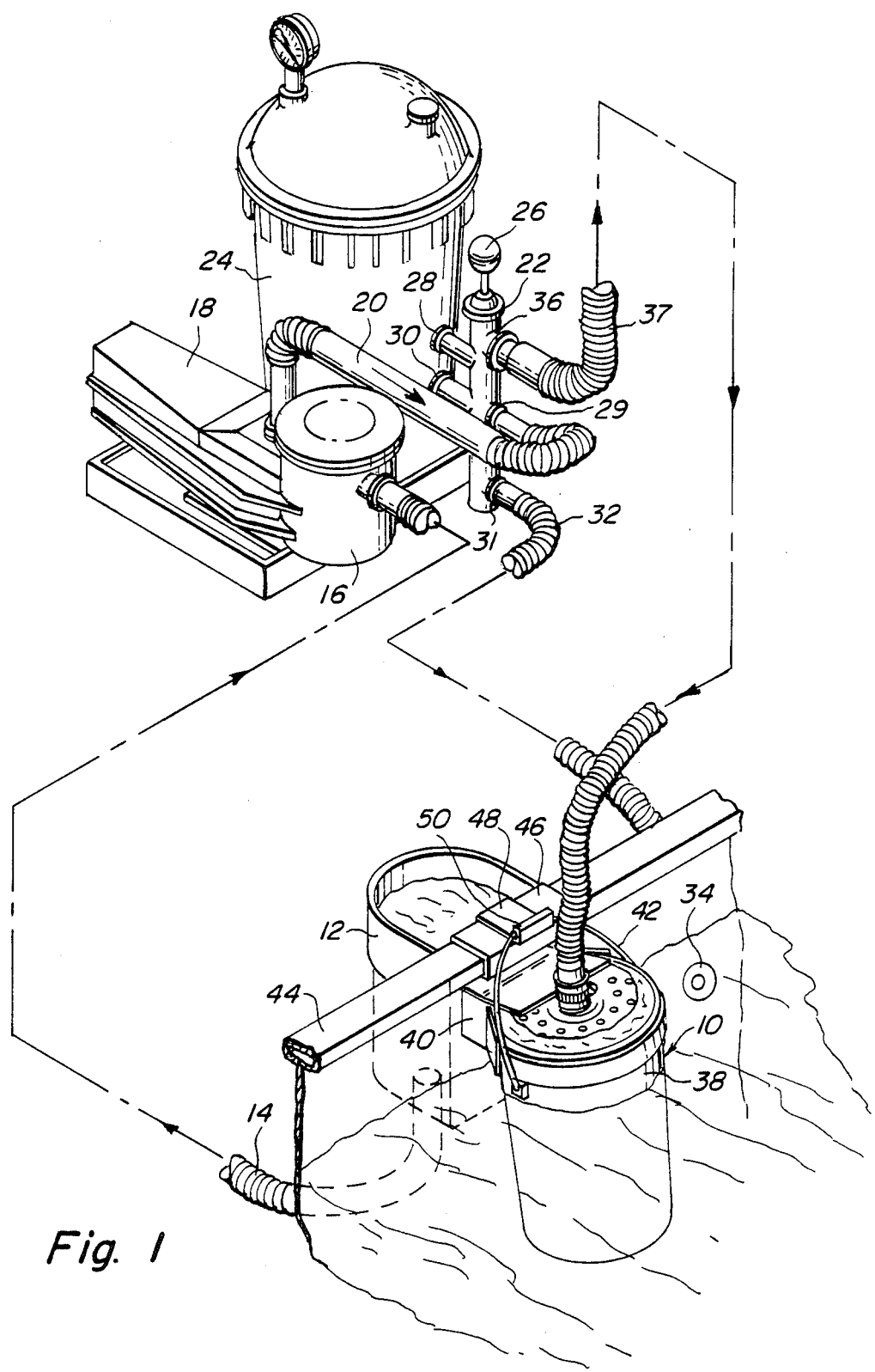
FIG. 1 is an exploded isometric pictorial showing the invention installed in a typical swimming pool plumbing circuit.

In FIG. 1, the invention 10 is shown installed into a swimming pool. In normal operation water enters skimmer 12 and flows through hose 14, into strainer assembly 16, through pump 18 and through hose 20 where it enters backwash flow valve 22 via port 29. Backwash flow valve 22 determines the direction of water through filter cannister 24 which typically contains either sand or diatomaceous earth. In normal, forward filtering operation, control knob 26 is in the downwards position and water passing through hose 20 enters filter cannister 24 at filter port 28, runs through the filter medium and exits through port 30. Forward filtered water exits through port 31 and hose 32 and finally returns to the swimming pool via water jet 34.

When the filter medium needs cleaning control knob 26 is pulled upwards. Water flowing into backwash flow valve 22 through port 29 now enters filter cannister 24 through port 30 where it rises through debris filled filter medium causing this debris to be backwashed and rise to the top of the filter medium. Debris-filled backwashed water exits filter cannister 24 via port 28 and enters backwash flow valve 22. This water with high particulate content exits backwash flow valve 22 via port 36 and hose 37 and enters the instant invention 10 where it is filtered by material contained in filter housing 38 and returns to the system via a chute 40 which conducts filtered backwashed water to skimmer 12.

Filter housing 38 is equipped with a mounting bail 42 which is used to support the instant invention 10. Since the cowling 44 of a pool is not exceptionally strong a cowling reinforcing channel 46 is placed over cowling 44 to prevent distortion of the cowling. An cowling plate 48, integral to cowling reinforcing channel 46 is provided with a hook 50 which engages mounting bail 42. The instant invention 10, is therefore securely suspended in the water.

The detailed operation and construction of the backwash filter itself may best be understood with reference to the exploded view shown in FIG. 2. Debris-filled backwash water enters the instant invention 10 via hose 37 at hose coupling 52 which typically may be fabricated from polyvinyl chloride fittings. Water passes through an aperture provided in the center of filter outlet disk 54. It then flows into cylindrical strainer 56 whose outer periphery has a multiplicity of apertures. Cylindrical strainer 56 is also typically fabricated using polyvinyl chloride. Water passes through these apertures and passes through filter materials 58 and 60 which may fabricated typically from gauze type material, or polyester fluff or any other available filter material. Filtered backwash water then is forced through the multiplicity of apertures in filter outlet disk 54 where it then flows into circular cap 56. A port 59 is provided through which filtered backwashed water now flows into chute 40.

Four self tapping screws 60, 62, 64 and 66 are used to secure circular cap 56 to filter outlet disk 54. Two of these screws, 64 and 66 also secure chute 40 to filter outlet disk 54 by first passing through holes in mounting tabs 68 and 70 respectively. The insant invention 10, is held together by a locking ring 72 which clamps around the outside of filter housing 38. A lever 74 which is free to pivot on pivoted joint 76 is used to bias hook 78 and buckle 80, so that when lever 74 is snapped to the right, locking ring 72 is firmly clamped to filter housing 38. At least two latch hooks, typified by 82 and 84, mate with aperture on the periphery of filter outlet disk 54 so that when lever 74 is snapped to the right the instant invention 10 is securely assembled.

In typical operation, the filter materials 58 and 60 may be cleaned by disassembling the instant invention 10 and rinsing the filter materials 58 and 60 approximately once every four backwashings depending upon the degree of particulate suspension.

Filtered backwash water which leaves port 59 in circular cap 56 pours onto a vinyl check valve 86 mounted into the chute by any known means, which curls sharply at both edges when no water is resting on top of it. In normal forward filtering applications, water flows into skimmer 12 by flowing under vinyl check valve 86. It is possible, therefore, to operate the pool filter system in the forward filtering mode without removing the instant invention 10. When water exits port 59, however, the weight of the water flatten vinyl check valve 86 and the only water which may enter skimmer 12 is the filtered backwashed water.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A filter backwash water saver and water filter in combination with a swimming pool filter system having a main filter, a skimmer unit for receiving water from a swimming pool during a forward filtering cycle, a pump receiving the water from the skimmer unit, a multi-ported backwash flow valve for controlling a forward flow of water from the pump through the main filter during the forward filtering cycle and a reverse flow of water from the pump through the main filter during a backwash cycle, an outlet hose for discharging filter water during the forward filtering cycle through the backwash flow valve from the main filter to the pool and a backwash discharge outlet for discharging water during the backwash cycle, said filter backwash water saver and water filter comprising: a backwash filter unit comprising a hose coupling to input backwashed water, a filter medium to remove debris from the backwash water, and a filter housing insertable into the pool and containing the filter medium, a connecting hose from the backwash discharge outlet of the multi-ported backwash flow valve to hose the coupling of the backwash filter unit, and a control valve coupled between the skimmer unit and the backwash filter unit for permitting a flow of water from the swimming pool into the skimmer unit during the forward filtering cycle and permitting a flow of water from the backwash filter unit into the skimmer unit during the backwash cycle.

2. A filter backwash water saver and water filter as in claim 1, wherein said backwash filter unit comprises an inner cylindrically shaped strainer made of rigid material and having means defining a multiplicity of apertures, a circular outlet disk having means defining a plurality of outlet apertures and a central inlet nozzle for mounting onto said cylindrical strainer, filter material surrounding said cylindrical strainer, an outer cylindrical canister containing said cylindrical strainer, said circular outlet disk and said filter material, and a circular cap member mounted onto said circular outlet disk and having an outlet port, said hose coupling being connected to said central inlet nozzle and said outlet port being coupled to said control valve, whereby backwash water flows into the central inlet nozzle and into the cylindical strainer, through the multiplicity of apertures, up through the filter material, out of the plurality of outlet apertures and them discharged through the outlet port to the control valve.

3. A filter backwash water saver and water filter as recited in claim 2, wherein said circular cap is attached to said circular outlet disk by a multiplicity of screw type fasteners.

4. A filter backwash water saver and water filter as recited in claim 3, wherein said attached circular cap and circular outlet disk are removably secured to said cylindrical canister by a circular locking ring which clamps onto the outer cylindrical surface of said cylindrical canister.

5. A filter backwash water saver and water filter as recited in claim 4, wherein said circular locking ring is locked into a biased position by a lever with pivoted joint which biases a buckle which engages a hook.

6. A filter backwash water saver and water filter as recited in claim 4, wherein said circular locking ring has at least two latch hooks which extend upward and engage with apertures along the periphery of said circular filter outlet disk, whereby, when said circular locking ring is clamped to said cylindrical canister said latch hooks engage said circular filter outlet disk thereby sealing the entire backwash filter unit.

7. A filter backwash water saver and water filter as recited in claim 2, wherein said control valve comprises a vinyl check valve which is mounted inside a rectangular chute whereby said vinyl check valve normally curls at the edge permitting forward cycle water to flow under said vinyl check valve when backwash liquid filtering is not in progress; and, which uncurls and flattens under the weight of flowing backwashed water, thereby conducting filtered backwashed water while blocking any other water from entering said forward water filtering cycle.

8. A filter backwash water saver and water filter as recited in claim 1, wherein said filter housing comprises a mounting bail and associated cowling reinforcing channel and cowling plate, whereby said cowling reinforcing channel is placed over a cowling at the periphery of a swimming pool thereby reinforcing said cowling; and, said cowling plate which is integral to said cowling reinforcing channel is hooked to engage said mounting bail thereby suspending said filter housing along the inner surface of said swimming pool.

* * * * *